United States Patent [19]

Brucker et al.

[11] 4,193,869
[45] Mar. 18, 1980

[54] WASTEWATER AND WASTEWATER SOLID PROCESSING SYSTEM

[76] Inventors: Milton Brucker, 1010 N. Rexford Dr., Beverly Hills, Calif. 90210; Ronald J. Matika, 4395 Jutland Ave., San Diego, Calif. 92117; Maurice E. McMican, 7970 Mission Gorge Rd., Santee, Calif. 92071

[21] Appl. No.: 879,061

[22] Filed: Feb. 21, 1978
(Under 37 CFR 1.47)

Related U.S. Application Data

[63] Continuation-in-part of Ser. No. 525,753, Nov. 21, 1974, abandoned, and Ser. No. 669,914, Mar. 24, 1976, abandoned.

[51] Int. Cl.² .................... B03D 1/00; B03D 1/24
[52] U.S. Cl. .......................... 210/44; 210/60; 210/64; 210/73 S; 210/195.1; 210/221 P; 210/259
[58] Field of Search ............ 210/7, 10, 11, 13, 44, 210/60, 62, 63 R, 63 F, 64, 73 S, 199, 202, 203, 221 P, 333.1, 78, 369, 195 R, 196, 195 S, 217, 253, 259, 297; 71/8, 9, 10; 23/259.1

[56] References Cited

U.S. PATENT DOCUMENTS

| | | | |
|---|---|---|---|
| 1,617,014 | 2/1927 | Derleth | 71/9 |
| 2,772,234 | 11/1956 | Kelly | 210/44 |
| 2,929,688 | 3/1960 | Riker | 71/9 |
| 2,994,432 | 8/1961 | Schluter | 210/44 |
| 3,236,766 | 2/1966 | Levin | 210/13 |
| 3,314,880 | 4/1967 | Rubin | 210/44 |
| 3,416,663 | 12/1968 | Muller | 210/78 |
| 3,479,281 | 11/1969 | Kikindai | 210/44 |
| 3,523,076 | 8/1970 | Goerz | 210/64 |
| 3,547,800 | 12/1970 | Pan | 210/44 |
| 3,623,608 | 11/1971 | Waterman | 210/221 P |
| 3,630,362 | 12/1971 | Matthews | 210/333.1 |
| 3,700,565 | 10/1972 | Cornish | 210/10 |
| 3,780,471 | 12/1973 | Ort | 210/44 |
| 3,836,460 | 9/1974 | Willis | 210/44 |
| 3,864,251 | 2/1975 | Cymbalisty | 210/44 |
| 3,914,173 | 10/1975 | Call | 210/64 |
| 3,959,131 | 5/1976 | Ramirez | 210/44 |
| 3,963,471 | 6/1976 | Hampton | 210/13 |
| 3,977,970 | 8/1976 | Willis | 210/44 |
| 4,053,399 | 10/1977 | Donnelly | 210/73 S |

FOREIGN PATENT DOCUMENTS

| | | | |
|---|---|---|---|
| 1023881 | 1/1978 | Canada | 210/221 M |
| 797158 | 4/1956 | United Kingdom | 210/44 |

OTHER PUBLICATIONS

Lindsley, "Aerobics, It Can Solve Your Sewage," Popular Science, Oct. 1970, 102, 103, 138.

Primary Examiner—Charles N. Hart
Assistant Examiner—Ernest G. Therkorn

[57] ABSTRACT

A system and method for processing wastewaters, domestic, industrial or otherwise, including producing a substantially sterile and recyclable organic material from the effluent wastewaters, and for producing at the same time a substantially sterile and recyclable organic material from solid matter in the wastewaters. The process system is complete as to separation of solids and liquid and as to the processing of both liquid and solid phases. The liquid phase may be used for agricultural purposes or passed to a unit from which only pure water is dispersed by evaporation and transpiration to the atmosphere while dissolved and nondissolved solid matter is decomposed. The solids separated by the system are dewatered by expressing the water therefrom, the solids then being bagged in loose form or pressed into solid blocks which may be stored on a pallet. This part of the process may be accomplished by rollers, presses, and/or microwave drying.

26 Claims, 11 Drawing Figures

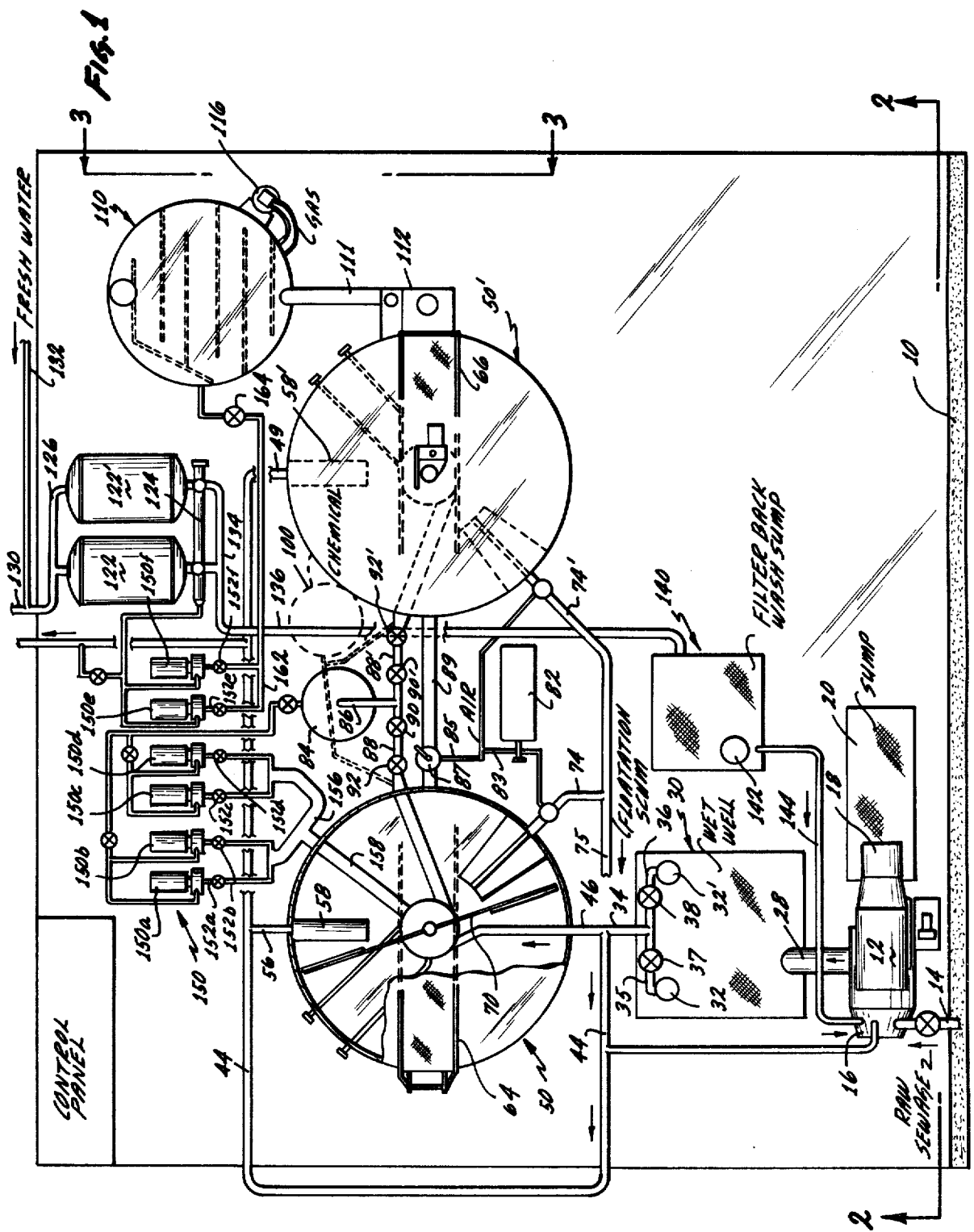

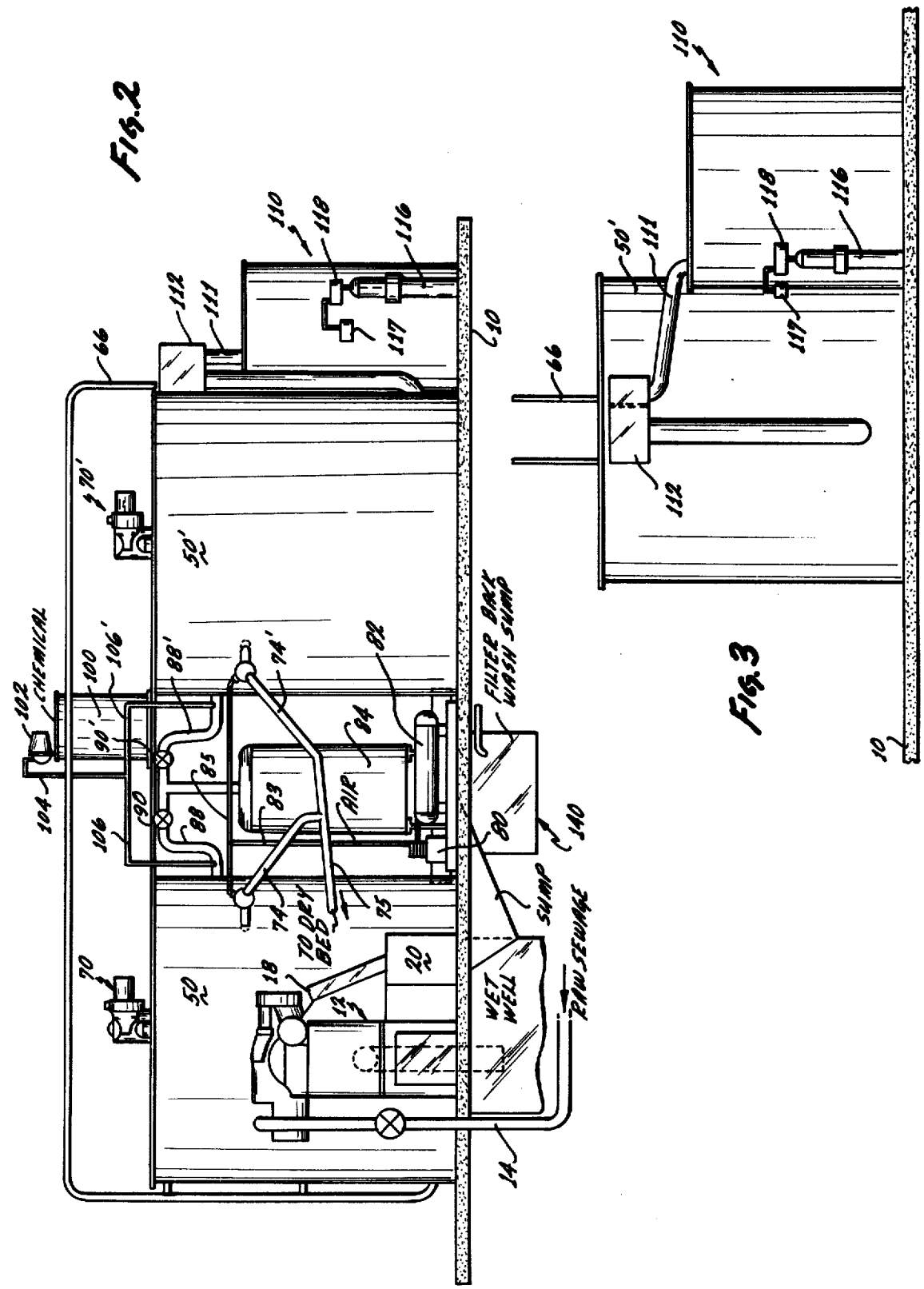

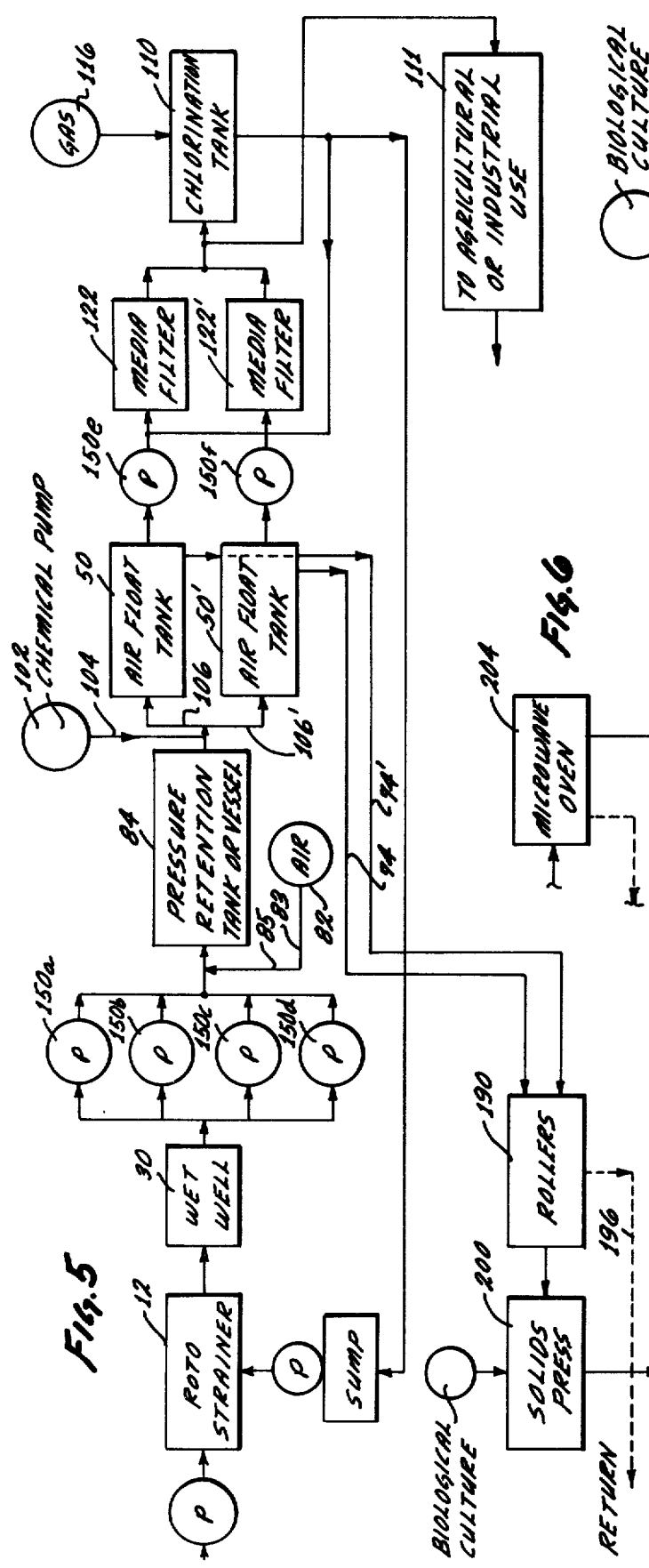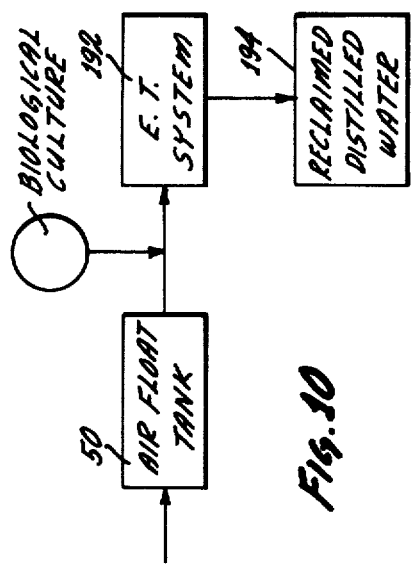

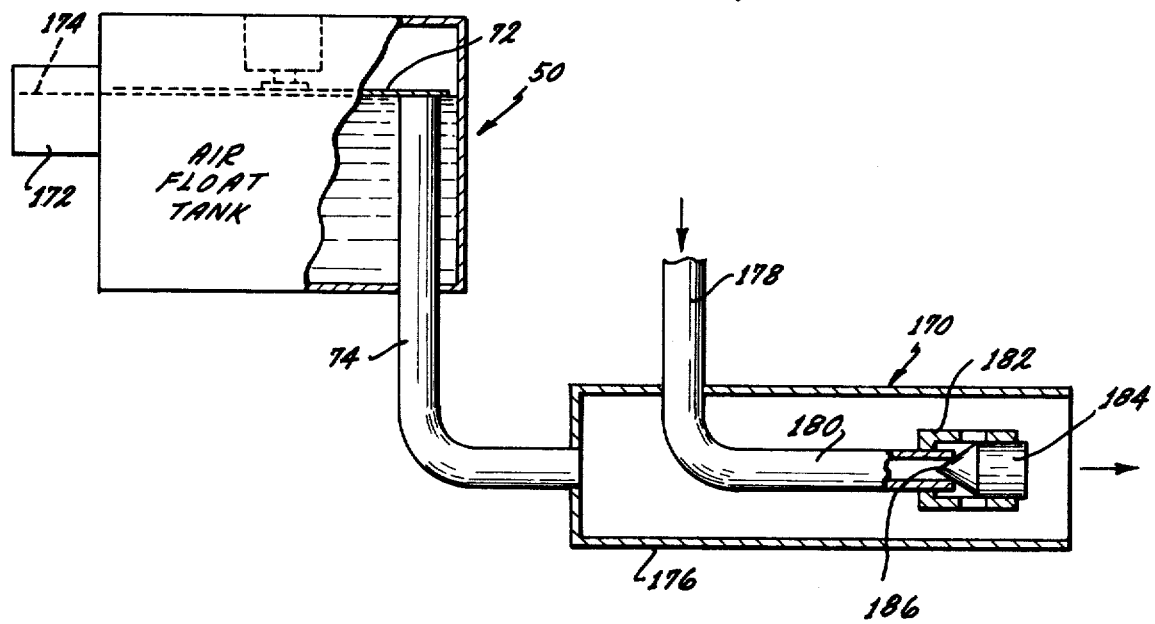
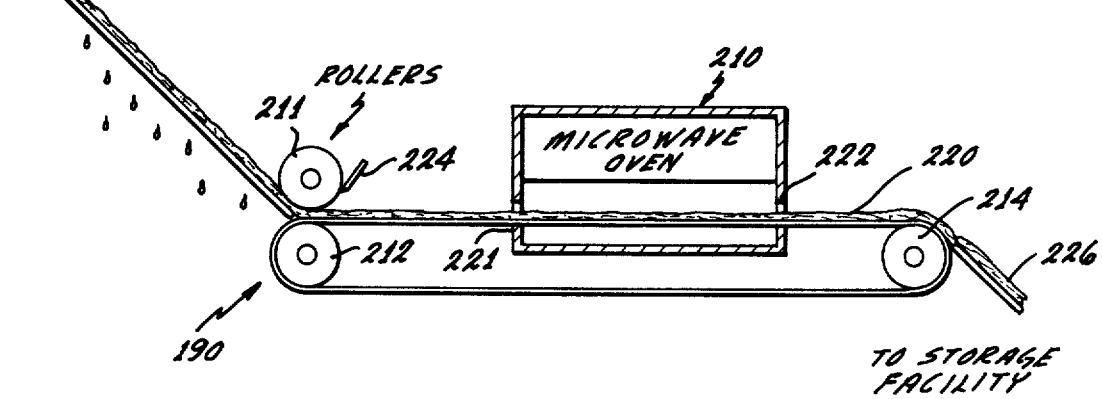

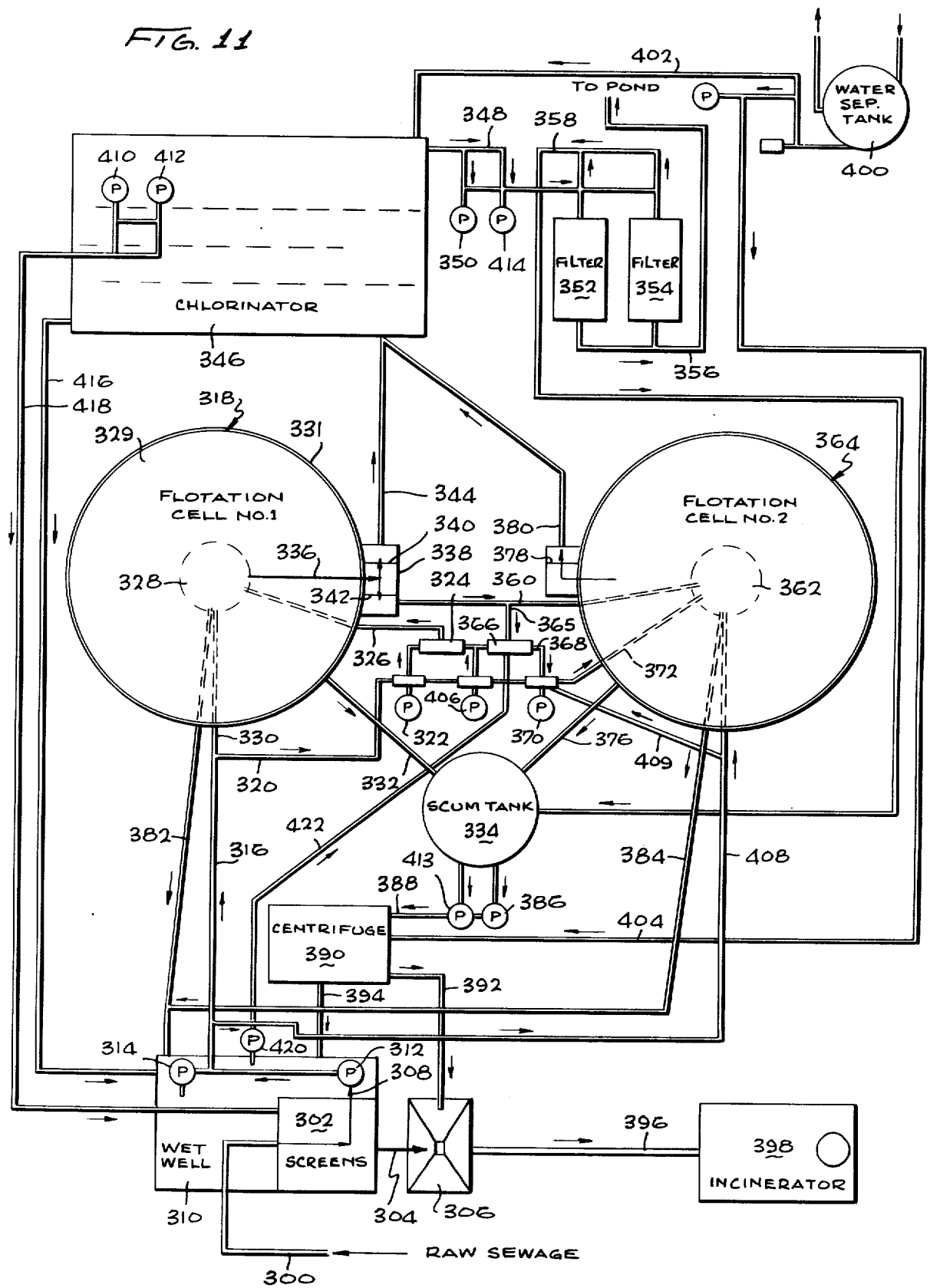

WASTEWATER AND WASTEWATER SOLID PROCESSING SYSTEM

RELATED APPLICATIONS

This application is a continuation-in-part of Ser. No. 525,753, filed Nov. 21, 1974, and of Ser. No. 669,914, filed Mar. 24, 1976 both now abandoned.

BACKGROUND OF THE INVENTION

1. Field of the Invention

The field of the invention is that identified in the Abstract.

2. Description of the Prior Art

The typical methods of handling the solids removed in the treatment of wastewaters such as domestic sewage and the like consist of collecting the solids from the various treatment units as a sludge; this sludge is commonly of 95-99% water content; and subjecting this sludge to one or more of the following treatments:

1. Transporting the sludge to a digester which is an enclosed volume in which the collected sludge undergoes biological digestion processed under anaerobic conditions for a period commonly varying from twenty to thirty days, after which the sludge (now typically reduced in organic content an additional fifty percent by the digester action) is removed either in tank trucks by deposition on lands available for such purposes or is pumped to drying beds for dewatering by evaporation and leaching. In the latter case, the dried sludge, after perhaps an additional thirty days of drying, is removed by vehicles to a land disposal site for that purpose.

2. Transporting the sludge to an incinerator where it is burned and the residual ash deposited in a disposal site available for that purpose.

3. Transporting the sludge to a reactor where heat, air and high pressure conditions transform part of it into relatively sterile matter suitable for use as a soil supplement or for disposal in sanitary landfills.

4. Transporting the sludge directly to sand beds for drying with subsequent handling as in case 1 above.

All the approaches described above handle sludge, which is primarily water rather than relatively dry, solid matter. All of the above-listed processes either require considerable processing time (as in the case of the digester process or in the sand bed drying process) or less considerably costly investment in sophisticated equipment with high capital and maintenance costs.

5. In cases of ocean discharge, costly piping is required which extends for miles out into the ocean.

6. Most water discharges are unsuitable for irrigation and other domestic uses.

Prior art patents are U.S. Pat. Nos.: 681,884; 1,945,051; 2,209,613; 2,222,310, 3,397,140; 2,279,603; 3,236,766; 3,256,179; 3,576,738; 3,361,779; 3,462,275; 3,613,893; 3,622,508; 3,640,820; 3,725,264; 3,700,565; 3,864,251; and Lindsley, Popular Science, Oct. 1970, p. 102, 103 and 138.

The herein system may be used in conjunction with any or all of the above treatment processes. The system which is described herein may be embodied as a treatment process independent of any of the above-mentioned typical wastewater treatment processes, even though it is also simply integratable into a treatment system which does use one or more of the above-mentioned typical treatment processes. Economics indicate the independent method is the most desirable way to go.

SUMMARY OF THE INVENTION

The invention is a system for processing wastewater and wastewater solids. It accepts wastewaters such as domestic or industrial sewage, food-processing wastewaters and associated solid matter, and other wastewaters of like nature. It removes a substantial fraction of the solid matter contained in suspension in these wastewaters, dewaters said solid matter, transports said pressed solid matter to a storage facility for further processing or optionally for immediate disposal, optionally further processes the solid matter to produce a soil supplement or subjects solids to microwave treatment which renders the material sterile. The system clarifies the influent wastewaters by a water separator and air flotation units, both with and without the use of chemical coagulants as the case may be, and discharges the clarified wastewaters at this stage of treatment, or alternatively transports the clarified wastewaters to a filter unit or a filter bed unit and the latter may be a filter bed which completes the treatment process by evaporating or transpiring pure water to the atmosphere while absorbing all contaminants in the filter bed media.

The physical-chemical system of the herein invention was designed to process domestic sewage, but with slight chemical variations, many industrial wastes can be processed. Conventional sewage treatment systems are mainly all of the biological type and require 12 to 24 hours to process wastes. This results in large storage and processing tanks along with odors of septic sewage generally associated with this type of system.

The herein physical-chemical system processes the wastes in 60 minutes or less thus preventing the waste from ever going septic and eliminating the need for large tanks.

In contrast to the typical methods mentioned above, the herein solids processing system is rapid, economic, and avoids the development of nuisance conditions which characterize most sludge handling processes. The herein approach in solids handling is compatible with the rapid treatment sequence of the herein approach to wastewater treatment. The herein process aims at producing a non-polluting effluent and indeed can produce pure water when the filter media are included in the treatment sequence. The herein system also aims at producing a non-polluting product and indeed produces a valuable soil supplement or fertilizer suitable for reuse in gardening, land restoration, or commercial agriculture.

The system of the invention requires less than 60 minutes process time to fully treat both the liquid and solid wastes. No digestors are required. Solids are removed and sterilized resulting in approximately 5 cubic yards of odor-free solids per million gallons of treated sewage.

The short retention times of the system minimize tank size requirements and reduces land area and space requirements which results in much lower site costs. The simplicity of the system renders it low in operational and maintenance costs.

The primary object of the invention is to realize a process in the form of an integrated system adapted for processing domestic and/or industrial wastewaters, or otherwise whereby to produce a substantially sterile and recyclable organic material from effluent wastewaters and for producing at the same time a substantially sterile and recyclable organic material from solid matter in the wastewaters. The objective is to realize a complete integrated system as to processing both liquid and solid phases. The output in the liquid phase is water meeting acceptable standards and the output in the solid phase is a material recyclable as a soil supplement. If potable water is desired, an evapo-transpiration or other tertiary system may be employed.

A further object is the realization of a process and apparatus for executing it as in the foregoing, whereby at stages in the process, separated solid matter is extracted and recycled or returned for transportation to a solid press roller or microwave treatment.

A further object is to realize a system which achieves the foregoing objectives without producing nuisance conditions which characterize typical, known sewage treatment processes.

A further object is to realize a process which produces a non-polluting affluent and in fact can produce water and also produce a non-polluting solid output product.

Among further objects are realization of the following:

Most importantly, the herein plant and process in operation meets the Federal Environmental Protection Agency requirements as well as the California Regional Quality Control Board water standards which are the most rigorous environmental standards in the nation.

Avoidance of major forward planning on installations resulting in major cost and time savings.

Systems of the invention can be mass produced for further cost savings.

Satellite plants may be installed at low incremental cost when and where needed as the volume of sewage increases.

Systems of the invention use 1/10th the land required by biological systems thereby substantially reducing land costs.

The relatively short 60 minute processing time to treat sewage eliminates costly holding tanks and results in very little odor.

The herein system generates no sludge. Biological systems generate sludge equal to 10-20% of the total volume input. For example, to process one million gallons per day a biological system generates between 5,000 and 10,000 gallons of sludge per day. The herein system produces less than five cubic yards of combined solids and scum per one million gallons of sewage treated.

Incineration or sterilization is made economical by the invention. In biological systems, the volume of sludge makes disposal extremely costly.

The herein system has a quick reaction capability. Installations can be accomplished within 4 months instead of 1-2 years required by biological systems.

Since each phase of the system is designed as a separate module there is the option of installing satellite systems in one or more locations according to need. Also, an existing facility may be upgraded with a system of the herein invention.

Redundant capability is designed into the system to transfer operations in case of pump failure in any module and to permit convenient system maintenance. Optional standby generators may be added to fail-safe operation.

Ecological and environmental are realized as follows:

Contamination of rivers, lakes and oceans is prevented.

Water treated by the process is immediately available for irrigation and industrial use.

The system maintains the original nitrogen content and is suitable for agriculture. Biological systems produce excessively high nitrogen levels that can damage crops when used for agricultural purposes.

With good quality water after treatment, a tertiary system can be employed economically for drinking water.

BRIEF DESCRIPTION OF THE DRAWINGS

Further objects and additional advantages will become apparent from the detailed description and annexed drawings, wherein:

FIG. 1 is a plan view of a treatment plant embodying the invention;

FIG. 2 is a side elevation of the plant of FIG. 1;

FIG. 3 is an end view of the plant of FIGS. 1 and 2;

FIG. 5 is a block diagram illustrating a complete preferred form of the process of the invention;

FIG. 6 is a view illustrating alternative processing of the liquid phase;

FIG. 7 is a diagrammatic view of a preferred form of roller assembly combined with a microwave oven, conveyor and scraper;

FIG. 8 is a schematic view of a type of solids press that may be utilized;

FIG. 9 is a schematic view of a preferred form of air flotation tank and defrother; and FIG. 10 is a view illustrating alternative processing of the solid phase.

FIG. 11 is a flow diagram of a preferred mode of operation.

DESCRIPTION OF THE PREFERRED EMBODIMENT

Figure 4:
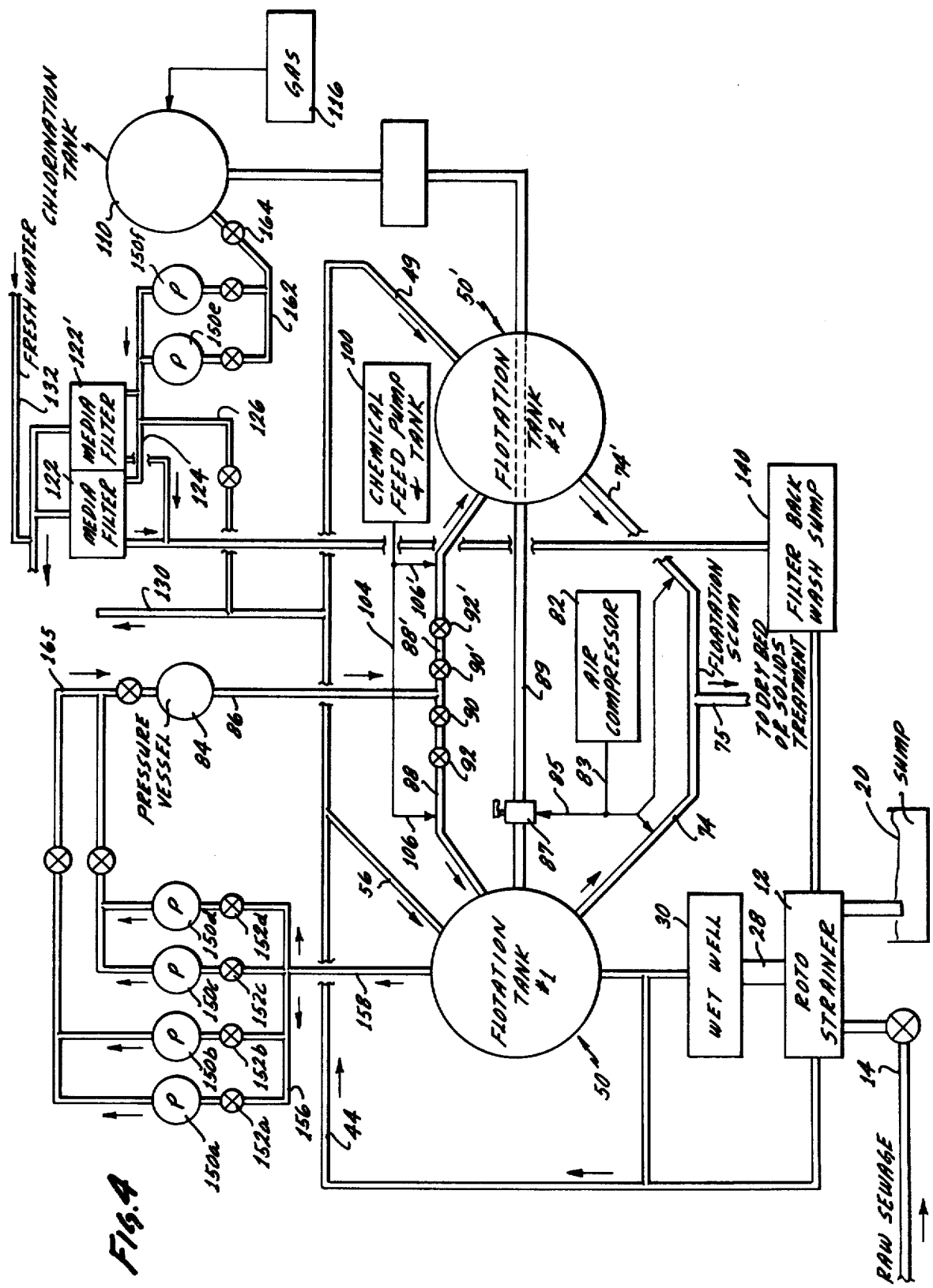
FIG. 4 is a schematic diagram of the plant of FIGS. 1-3.

FIGS. 1, 2 and 3 show the layout of a plant with all of its components including the modular components, FIG. 1 being a plan view, FIG. 2 being a front elevation and FIG. 3 being a side elevation. FIG. 4 is a schematic diagram of the plant.

The various components of the plant and the connections between them will be described in the same sequence in which the wastewaters flow through the components. The foundation on which the plant rests is designated at 10. All of the principal components are based on the foundation platform. Numeral 12 designates a separator unit for separating solids from the wastewater of sizes larger than 1/20,000 at a rate of one minute. This unit may be one of a known commercial type preferably a unit known as a Rotor Strainer. The wastewaters or raw sewage enter this unit through a pipe designated at 14 which leads to a manifold 16 which is part of the unit 12. The separated solids are delivered from the right-hand part of the unit 12 as designated at 18 and they may then be delivered into a solids sump and holder of dry sludge as designated at 20.

The wastewaters from the unit 12 are delivered through a conduit 28 into a wet well tank as designated at 30. Numerals 32 and 32' designate wet well pumps, the discharges of which are connected to pipe 34 by pipes 35 and 36 having valves 37 and 38 in them. Pipe 34 connects to branch pipes 44 and 46. The pipe 46 connects to the center of a first flotation tank as designated at 50, a second flotation tank being designated at 50'. These units are modular, capable of being used individually or together in parallel.

Pipe 46 connects to the top of flotation tank 50 and a similar pipe 46' connects to the top of the other flotation tank 50'. Pipe 44 has a branch connection 56 which connects to filter 58 in the flotation tank 50 and it has a branch 60 which connects to a filter 58' in flotation tank 50'.

Numeral 64 designates a suitably supported catwalk overlying the flotation tanks at 50 and 50' with one or more associated hand rails as designated at 66.

The flotation tank 50 is preferably of a known commercial type including a motor driven skimmer 70 which skims off the solid materials which rise to the surface which are deposited in a hopper 72 and which can then be carried off through a pipe 74 to a further flotation scum pipe 75 that will be referred to again presently. The flotation tank 50' is like the tank 50 and therefore need not be further described. Flotation tank 50 is described more in detail hereinafter in connection with FIG. 9.

The plant utilizes a retention tank for the wastewaters wherein compressed air is pumped into the waters from a source which is an air compressor. The air compressor is designated at 80, the compressor discharging into the flotation tanks as will be described.

Air can be admitted from the compressor into tanks 50 and 50' by way of lines 83 and 85 and valve 87, the air being pumped into line 89.

Numeral 84 designates a pressure vessel having a discharge pipe 86 with branch connecting pipes 88 and 88' leading to the flotation tanks 50 and 50' and these branch pipes having in them flotation control diaphragm valves 90 and 90'. In the branch connections 88 and 88' are additional control valves 92 and 92' as may be seen in FIG. 1.

Numeral 100 designates a chemical feed tank from which chemical may be pumped by a chemical feed pump 102, this pump discharging into the line 104 having branches 106 and 106' that connect to the branch pipe connections 88 and 88' and leading to the two air flotation tanks.

Numeral 110 designates a chlorination tank positioned as may be seen in FIGS. 1, 2 and 3. The upper part of the chlorination tank is connected by a pipe 11 to the weir housing 112 of the air flotation tank 50'. The chlorine bottle is designated at 116 in the figures and associated with it are control instrumentalities 117 and 118 for purposes of controlling the admission of chlorine gas to the chlorination tank 110. Liquid from the chlorination tank can be pumped into the water flow as will be described presently. Numerals 122 and 122' designate a pair of modular multimedia filters. Numeral 124 designates an inlet manifold connected to the filters in parallel and numeral 126 designates a discharge manifold to which both of the filters are connected, the purified water from the system being discharged through a pipe 130. Numeral 132 designates a fresh water pipe through which water may be brought in for purposes of backwashing the filters.

Numeral 134 designates a backwash manifold which is connected to both of the filters 122 and 122' and this manifold connects to a pipe 136 which leads to a filter backwash sump or tank 140. Numeral 142 designates a sump pump which can pump out of the tank 140 and through a pipe 144 back into the manifold 16 of the separator unit 12.

Numeral 150 designates a battery of modular process and filter pumps individually identified by numerals 150a through 150f. These pumps are alike and are modular. They have suction lines as designated at 152a through 152f. Each of these lines has in it a manual valve in it as shown. The suction lines 152a and 152d are also connected to this manifold; these two pairs of pumps can be operated one pair at a time or can be operated together. The manifold 156 connects to pipe 158 taking suction from the flotation tank 50. The suction lines 152e and 152f are for the other two pumps that connect to a line 162 which connects to the chlorination tank 110, this line having in it a valve 164. The pumps 150a-150b have discharges manifolded together so that they can pump into a line 165 that connects to the pressure vessel 84.

The complete operation of the plant and the process will be described presently.

A preferred form of air flotation tank assembly is shown in FIG. 9. In this figure there is included a defrother unit 170 which will be referred to again presently. Numeral 172 designates a small tank at the side of the air flotation tank 50 having a weir 174 in it arranged so that water flows over the weir for maintaining the level in the tank 50. Numeral 72 designates schematically the rotary skimmer or scraper which causes the solids and froth to be discharged into a discharge line 74 to which a suction is intermittently applied. As previously stated, the air flotation tank assembly per se is essentially conventional and is accordingly shown schematically. The level in it may, however, be controlled in other ways, such as by automatic control instrumentalities.

The defrother 170 comprises a channel or chamber 176 with an air line 178 extending into it and along its axis as designated at 180. At the end of the tube part 180 is a collar or fixture 182 which holds dispersing member 184 having a conical point 186 in the end of the tube part 180. Air pressure is intermittently applied to the tube 178 under control of a switch operated by the rotary skimmer 72. This air flowing past the dispersing member 184 through the openings in the collar 182 disperses and collapses any froth or bubbles in the stream of effluent. The air pressure causes a flow and produces a suction in the line 74. The suction is applied as the scraper or skimmer moves over the upper end of the tube 74. The effluent from the defrother 170 preferably is recycled through the Roto Strainer 12 by line 43 (FIG. 1) or may be directed directly to the roller unit 190 by standard material handling means.

If, for whatever reason, it is acceptable or desirable to terminate the treatment process after the action of the air flotation tank 50, then a terminal chlorination of the effluent is performed using standard chlorination units as will be described.

FIG. 5 is a flow chart which illustrates the processing of the entire plant including both the liquid and solids components. Solids are combined and collected on a conveyor system. Standard material handling techniques may be employed in this phase. The solids pass along the conveyor through a series of rollers 190. Numeral 196 designates a return line for water expressed by the roller component 190 to the influent line. This material can now be left to further air dry. The conveyor can further transport the material to a solids press 200, where the solids may be formed into blocks or flats. These blocks or flats must now be placed in a storage facility 202 to let composting take place (usually 15 days). The solids can be impregnated with seeds such as grass or alfalfa prior to pressing and this will result in a prolific growth on the flats. They may then be laid side by side and using water from the liquid portion of the system, irrigated. The growth of the planted crop feeds on the nutrients in the sewage thus aiding the composting cycle in returning the material to humus.

Alternatively, if immediate disposal is desired, as illustrated in FIG. 6, the solids can be passed from the rollers directly through a microwave conveyor oven 204 and bagged in bagging facility 206 or may be hauled away in bulk. Immediately this material is substantially sterile and dry, and can be used as an excellent soil supplement.

All excretions from the rollers, flats or microwave units are returned to the inlet structure 12 for recycling by line 196.

FIG. 7 illustrates schematically preferred arrangement of the roller unit 190 and in this figure the roller unit is shown combined with the microwave oven 210. Solids may be delivered to the rollers by conveyor means as previously described or they may be received directly from the unit 12. The two rollers designated at 211 and 212 are substantially tangent. These rollers are motor driven. Numeral 220 designates a conveyor belt that passes over roller 212 and another roller 214. The microwave oven is schematic as shown. It is of a tunnel type, having openings as shown at 221 and 222 for the upper reach of the conveyor belt to pass through. The microwave oven is constructed to ensure against the escape of any harmful radiation. The scraper 224 may be provided, associated with the roller 211. Numeral 226 designates a scraper positioned to scrape compacted solids off the conveyor 220, positioned for them to be delivered to the solids press 200.

The complete solids processing system includes provisions for adding minerals and other nutrients to the composted material to improve the quality of the material for use in gardening, landscaping and in commercial agriculture.

It is understood that the details of the solids processing units described refer to one possible configuration. These details may vary depending on the specific solids to be processed.

For example and not to be limiting, the press loading chamber may be as schematically shown in FIG. 8 comprising cylinder 230, hopper 231 and piston 232 having stem 234 operable by hydraulic cylinder 236. Small blocks of rectangular or cylindrical cross section and of a volume of a fraction of a cubic foot, or large bales of mass in excess of many pounds can be formed by the press as shown.

FIG. 10 is a modified form of processing the liquid phase. The waters pass to evapo-transpiration unit 192 for purification and then to reclaimed water container 194.

PREFERRED EMBODIMENT PROCESS

The process will be described in relation to the drawing of the physical plant, FIGS. 1-4 and the flow diagram, FIG. 5.

The process is a physical-chemical one and embodies two sub-processes or aspects, one treating the liquid fraction and the other the solid fraction. The influent may be one characterized by a B.O.D. (biological oxygen demand) of 200-400 and over mg/l and suspended solids 200-400 and over mg/l.

The steps of the overall process of treatment are common to biological processes utilizing the inlet structure and grid chamber 12 to remove large heavy objects etc. Then the screening process removes solids down to five hundred microns using 0.020 inch rotating screen, a Roto-Strainer or static screen. At this point, there is an initial separation of liquids and solids. As respects the separation of the heavy solids, there is a continuous separation of solids larger than 1/20,000th at the rate of one per minute. At this step of the process, there is a 40% reduction of biological oxygen demand and suspended solids, the separated water being conveyed to a holding well as will be described.

PROCESSING THE LIQUID FRACTION

The water is now conveyed to the surge holding tank or wet well tank 30 in which sufficient water is accumulated for treatment. The tank can handle excessive input volumes. The holding time in the surge holding tank is from zero to fifteen minutes.

The next step is the chemical addition to the water. This is accomplished by way of the chemical feed pump 102 and tank 100 that is able to pump into the lines 106 and 106'. The chemical is preferably a specifically selected commercially available polymer such as PEB 1090 available from Dow Chemical Company, admitted at the rate of 5-20 ppm. The preferred range depends on quantity, that is, the amount of solids to be removed. At this step or stage in the process, there is a flocculation of suspended and dissolved solids in the water by the flocculent action of the polymers. The water is then pumped towards a first mixing retention tank identified at 84 in the drawings.

At this point, there is an air addition to the water. Compressed air is pumped into the water by compressor 82 to forty pounds per square inch or to fifty pounds per square inch in the retention tank 84. Air is dissolved in the water in a period from two to five minutes. Excessive air is included in this step to facilitate the next step. Water is then pumped to the center of the first flotation tank identified at 50.

At the first flotation tank 50, the water is pumped to the center of the tank. The flocculated particles (by chemicals) are a focus of air bubble formation. Particles rise to the surface due to the processing. The flotation tank is of the type as previously described having a scraper on top which removes the floated coagulated solids, this phase of the process occupying from ten to fifteen minutes. There is an additional removal of 30% of suspended and dissolved solids (as total suspended solids and biochemical oxygen demand). The dissolved solids are nutrients and salts—biochemical oxygen demand is essentially the nutrients. (Further reference will be made to the handling of the solids under the description of the solids aspects of the process). The water is now pumped to a further retention tank for the second chemical addition. This is a chemical addition of more similar polymers and/or complementary polymers. There is further flocculation of suspended and partially dissolved materials. Water is then pumped to the next air mixing retention tank.

At this tank, there is another addition of air. Compressed air is mixed with and pumped into the water to fifty-sixty-seventy pounds per square inch of pressure. The water is held in retention for a two to five minute period. Excessive air is added and dissolved in the water to facilitate the next step to be described. The water is now pumped to the second air flotation tank identified at 50'.

The second air flotation constitutes a second polishing of the water by flotation. Flocculated solids are focii or air bubble formation when pressure is released from the pressure of sixty pounds per square inch in the retention tank to atmospheric in the second flotation cell or tank 50'. The particles float to the surface or are carried for removal as described. The retention time may be ten-fifteen minutes. There is a reduction of another 10% of initial sewage (waste water) of suspended solids and biochemical oxygen demand at this stage. At this stage, water flows over a weir in the air flotation tank to a float control chlorination tank.

The next step is the chlorination or sterilization of the water from tank 110. There is an addition of chlorine gas 10 ppm. or ozone is mixed with the water and there is a holding transiently for killing of bacteria and pathogens. The time at this stage is in the range of five-fifteen minutes. At this stage, the water is sterile and there is high dissolved oxygen and a residual chlorine level. The dissolved oxygen may be in the amount of two mg/liter. A float control is provided at this retention step awaiting the filtration step.

Water is next conveyed, that is, pumped to the dual multimedia filters identified at 122 and 122'. In these filters, there is filtration of some flocculated materials and removal of dissolved organic compounds on a carbon bed. At this stage, there is a reduction of 10% biological oxygen demand (B.O.D.) and suspended solids. The final effluent quality biological oxygen demand—10–30 mg/l, suspended solids—5–25 mg/l. Water may then be pumped to water reusage equipment or storage.

Summarizing, septic sewage is treated to become aseptic, reusable water meeting all current and proposed 1983 EPA standards by the above process. Reduction of biological oxygen demand and suspended solids is approximately 90% within one hour.

PROCESSING OF SOLIDS

Initially, as pointed out, there is primary screening by way of unit 12 at which point the solids are dewatered or they may be dewatered at unit 190. The next step in the handling of these solids is sterilization or incineration-coliform 300MPN/100ml.

The skimmings from the flotation tanks 50 and 50', that is the scum, could be dewatered by a centrifuge or otherwise, if desired. Preferably, this is done in the unit 190. Then there is sterilization of incineration-coliform 300 MPN/100ml, as described above.

All of the solids may be used for land fill. The further handling of the solids may be as described in connection with FIGS. 5–8.

FIG. 11 is a flow diagram of a preferred system and mode of operation according to the invention, for treating and purifying wastewaters. The mode of operation according to the present embodiment incorporates the phases of influent flow, solids and scum handling, back-up or alternate flow, recirculation and peak flow.

With respect to influent flow, scum and solids handling, the influent containing solids and organic matter, and which is derived from raw sewage is brought into the sewage plant illustrated in FIG. 11 by pumps from a lift station (not shown). The flow of influent, indicated at 300, is directed to the top of two stacked screens located in the area at 302. One of these screens has a 0.060" wire spacing which screens off the solid particles of a size greater than 0.060" and the screened influent then flows by gravity down to a lower screen having a 0.020" wire spacing, which separates any solid particles over 0.020" which pass through the first screen. The solids separated by both screens, and indicated at 304, fall by gravity into a hopper 306 for further treatment, as pointed out hereinafter.

The remaining influent or water, following separation of solids therefrom by passage through the screens at 302, flows by gravity, as indicated at 308 into a wet well at 310. The wet well has two pumps, one of which at 312 handles the normal flow of influent through the wet well, the other at 314 functioning as a back-up. The wet well contains floats (not shown) which activate and deactivate pumps 312 and 314 depending upon the height of the fluid level in the wet well. Thus, such floats activate the pumps when the fluid level reaches a certain height in the wet well and turns the pumps off when the wet well has been pumped down.

Influent from the wet well is then pumped by pump 312 via line 316 to a first flotation cell 318, e.g. at a flow rate of 200 gallons per minute (GPM). A portion of such influent is introduced via line 320 into a tank 324 wherein flocculating chemicals are added to the influent. Any suitable floculants can be employed, including polymers such as PEB 1090, noted above, or long chain fatty acids of from about 12 to about 22 carbon atoms, employed as collectors in chemical flotation, such as the material marketed as Hercules Pamak W4, an oleic acid-type material. Other additives for flocculating or coagulating the fine particles present in the influent at this stage of the process can be employed. Thus, for example, organic polymers can be used with an inorganic coagulant such as ferric chloride, ferric sulfate, aluminum sulfate (alum) or lime. Only a small amount of floculant or coagulant need be employed, typical dosages being 0.25 mg/l to 1 mg/l, only a small amount, e.g. 5–20 ppm, of the PEB 1090 material noted above being effective.

Compressed air at 40–50 psi is then added to the water containing floculating additive by the pump or compressor 322. If desired, as an alternative to the above procedure, flocculating chemical or additive can be added to the influent following the introduction of compressed air.

The water containing dissolved air and floculating chemical, is introduced via line 326 into the lower end of the center section 328 of flotation cell 318, wherein it is mixed with incoming influent via lines 316 and 330. The air flotation cell 318 is at atmospheric pressure, substantially below the pressure of the air in the influent in line 326, and the introduction of such influent containing dissolved compressed air and in which the fine particles have been flocculated by addition of the floculating chemical, into the flotation cell results in the creation of microscopic bubbles, causing the floculated particles to rise in the center section 328 of the flotation cell, to the surface, forming a white, milky foam of very fine particles. Thus, there is a circulation flow upwardly through the center section 328 of the flotation cell, then outwardly and then downwardly in the annulus 329 between the outer wall 331 and center section 328 of the flotation cell. As previously noted, the flotation tank or cell 318 is provided with a scraper or rotating skimmer (not shown), which skims off the fine particles. The particles thus skimmed off are conveyed by pipe 332 by gravity to a scum tank 334 for further treatment as noted hereinafter.

The clarified water is conveyed at 336 from the center of the flotation cell or tank 318 to a double weir indicated at 338, in the form of a pair of weirs 340 and 342. The flow over these weirs can be controlled by raising or lowering one of the weirs with respect to the other. By lowering the upper weir 340, the clarified water can be conveyed via line 344 to a sterilizer or chlorinator tank 346. In such tank a suitable sterilizing agent is introduced into the water, with sufficient contact time provided in the sterilizer tank for killing the bacteria and sterilizing the water. For this purpose, chlorine gas in sufficient concentration, e.g. 10 ppm, or ozone, can be used, preferably the former.

From the sterilizer or chlorinator, the sterilized water is conducted via line 348 and pump 350 to each of a pair of filters 352 and 354, preferably multimedia filtration units. Any undissolved solids in the water are removed by the filters. After passing through such filters, the clear, purified water passes via line 356 to a pond (not shown). The filters are back washed when their efficiency is substantially reduced. The back wash from filters 352 and 354 is conveyed via line 358 to the scum tank 334. The filters 352 and 354 are used intermittently so that while one of the filters, e.g. 352, is on the stream, the other, e.g. 354, is being back washed. As an alternative, the clarified water from the flotation cell 318 can be conducted first in the filters 352 and 354 to remove any undissolved solids and the filtered influent then introduced into the sterilizer or chlorinator tank 346.

A portion of the water leaving the first flotation tank at 336 and fed to the double weir 338, is caused to flow by gravity feed over the lower weir 342 and via line 360 into the lower end of the center section 362 of a second flotation cell 364 similar in construction to that of the first flotation cell 318. A portion of the influent in line 360 is diverted via line 365 to container 366, which communicates via line 368 with pump 370. As in the case of the influent initially passed to the first flotation cell, flocculating chemical or additive, as previously described, is added to the influent in container 366, and air is introduced therein by pump 370. The so-treated influent is then fed via line 372 also into the center section 362 of the second flotation cell, wherein it is mixed with the influent passing into such center section via line 360. As in the case of the first flotation cell 318, flotation cell 364 is also at atmospheric pressure, causing the formation of bubbles from release of the air pressure in the pressurized influent entering via 372, and causing the flocculated particles in such influent to float upwardly through the center section 362 to the surface of the flotation cell, such particles being skimmed off and passed via gravity through line 376 back to the scum tank 334.

The second flotation cell 364 functions to "polish", that is to further clean, the water more thoroughly. The resulting clear water from flotation cell 364 passes over a weir 378 and via line 380 to the sterilizer or chlorinator 346, where the water is treated with chlorine or ozone, as noted above, and passed to filters 352 and 354, and the resulting clear water conveyed to the pond by line 356.

Below each of the flotation cells 318 and 364 is a grit box (not shown) where any grit or settled solids are moved into it by suitable means such as a scraper (not shown). Such grit is slurried with water, which flows by gravity via lines 382 and 384 from flotation cells 318 and 364 respectively to a special filter box (not shown) in the wet well 310, where the grit or solid particles are separated. This is essentially a manual operation which is carried out periodically to insure the cleanliness of the flotation cells. The separated grit material is transported to the hopper 306 for further treatment.

The scum flow which accumulates in the scum tank 334 and is controlled by floats (not shown) is pumped by pump 386 via line 388 to a centrifuge 390. The fine particles separated from the liquid by the centrifuge are deposited by gravity via line 392 into the hopper 306 with the solids which were separated by screens 302, and the grit solids removed from the flotation cells, for further treatment. The water separated by the centrifuge is conducted by gravity via line 394 back to the wet well for reintroduction into the treatment system. The solids accummulated in the hopper 306 are forced by suitable means (not shown) via line 396 into an incinerator 398, and the solids are incinerated therein to an ash. The result is about ⅛ cubic yard of ash per 250,000 gallons per day plant capacity.

In the process described above, it will be noted that special features of the process include the injection of air under controlled pressure into the influent stream, together with suitable flocculating agents, and the introduction of the so-treated influent into the center of the air flotation chambers, whereby the rapid pressure reduction creates microscopic bubbles that become attached to suspended solids and floats them to the surface where they are removed, as previously noted, by suitable means such as a skimmer. At this stage the undissolved particles have grown to a size that can be filtered. Closely controlled quantities of chlorine or ozone are injected into the liquid to obtain full pathogenic kill and major color removal, and the clarified and sterile water is pumped to filters such as multimedia filtration units, which accomplishes final treatment where any undissolved solids and dead bacteria in the water are removed. The water so-obtained, and fed to the pond, as noted above, is now clear, pathogenically clean and odor-free.

Fresh water at the tank 400 is brought intermittently into the system for introduction via line 402 into the chlorinator 346 for mixing with chlorine, and such fresh water is also conducted intermittently via line 404 to back-wash the centrifuge 390.

As previously noted, a plurality of back-up or alternate flow features are also incorporated into the overall water purification system illustrated in FIG. 11. Thus, the wet well 310 is provided with a second pump 314 for redundancy. In case of the requirement for repair or maintenance of the first flotation cell 318, the flow of influent can be diverted via line 408 directly into the center section of the second flotation cell 364. A portion of the influent in line 408 is by-passed through line 409, and following treatment with compressed air and flocculating agents, as described above, is pumped at 370 through line 372, into the center section 362 of the second flotation cell 364, where it is mixed with the influent entering via line 408, for removal of fine particles. The resulting clear influent will then be sent directly to chlorination, filtering and then to the pond, as described above.

In case the second flotation cell 364 requires maintenance, the weirs 340 and 342 can be adjusted so that the flow from the first flotation cell 318 can go directly to sterilization or chlorination, filtering and then to the pond, with no influent being diverted to the second flotation cell 364.

It will be noted that there are three pumps 322, 370 and a center back-up pump 406 for introducing compressed air in the water and pumping the water into the center column or section of the first and second flotation cells 318 and 364. The center pump 406 is the back-up for either of the other pumps 322 or 370, providing redundancy. In the sterilization or chlorinator tank is a second pump 410, in addition to pump 412, which is required for recirculation, as noted below. A second back-up pump 413 is also provided at the scum tank 334. There is also a second pump 414 provided for pumping the water from the chlorinator tank 346 to the filters 362 and 354, in case pump 350 fails. Below the centrifuge 390 is a special filter (not shown), which is manually operated, for back-up of the centrifuge.

The above back-up system insures that the plant will operate at all times.

A recirculation system as indicated above, is also built into the water purification process and system illustrated in FIG. 11, so as to keep the system from becoming septic, in case there is no influent coming into the system. This permits the system in effect to be circulating by itself when no incoming input is available.

For this purpose, there is provided in the sterilizer or chlorinator tank 346, an overflow pipe at 416 which leads to the wet well 310. Another overflow line 418 containing pump 412 is also provided at the chlorinator, and which communicates with the screens 302 and the wet well 310, and which circulates water thereto from the chlorinator, by means of the pump 412, and the back-up pump 410, noted above. The pump 412 in the sterilization or chlorination tank is used intermittently, that is, during hours where there is little or no flow into the plant. The operation of this pump is controlled by a timer (not shown), so that at certain hours when the flow into the plant is very limited, pump 412 automatically turns on and the sterilized or chlorinated water is directed to the screens and recycles through the entire plant. This insures that the influent is never left in the system at any time to become septic. Thus, the plant can operate successfully at zero influent flow or up to the plant capacity, for example, 250,000 gallons per day. On the other hand, all other known systems require incoming material at all times to operate; otherwise they fail. Thus, the sewage treatment system described above can operate idly and still operate successfully and maintain the quality of the resulting clear water product whenever any influent does come into the system.

The second flotation cell 364 is provided mainly as a back-up for the system. When there is peak flow over the rated capacity of the plant, according to an additional feature, a third sump pump 420 provided in the wet well 310, is actuated by a float (not shown) which is higher than the floats operating pumps 312 and 314. Under these conditions, the upper weir 340 of the double weig 338 is automatically lowered, so that the water treated in the first flotation cell 318 goes directly to the chlorination tank 346 for final treatment therein. The excess influent is pumped by the third pump 420 through line 422 for treatment with floculating chemical at 366 and introduction of compressed air into the influent by pump 370, followed by passage of the so-treated influent via line 372 into the center 362 of the second flotation cell 364, to remove floculated particles as noted above. The resulting clear water then passes over weir 378 and line 380 to the chlorinator 346. Now both flotation cells 318 and 364 operate independently and treat the additional influent simultaneously. This permits substantially increasing the plant capacity, e.g. doubling the plant capacity. When operating in this manner, the amount of chlorine introduced into chlorinator 346 is substantially increased, for example doubled, when the capacity is correspondingly increased.

An aerated pond is optionally added as a back up to treat any dissolved B.O.D. which has not been fully eliminated in the process in order to meet water quality control standards.

A significant aspect of the improvement or advantage residing in the method is in the sludge volume. Conventional systems produce activated sludge in the amount of twenty-five-fifty cubic yards/pmg. and five-ten thousand gallons/pmg. The subject system produces less than five cubic yards of sludge per million gallons.

There is ammonia generation removal which may be by air stripping, break point chlorination or biological fermentation. In conventional systems, there may be two hundred pounds per million gallons whereas in the subject system there is none.

With respect to $PO_4$, release into water by fermentation in conventional systems typically may be one gram/gallon sludge whereas in the subject method there is none.

Referring to the solids, after dewatering and sterilization, the material is of a peat moss consistency and can be immediately used for land fill.

Quantities of solids realized are approximately five cubic yards per million gallons sewage processed. The complete processing time is less than 60 minutes thus eliminating the need for large holding tanks. As a result, the entire system is relatively small compared to a biological plant of similar capacity.

The system is a physical-chemical process designed to separate and remove solids from waste water in minimum time and at minimum cost. Each system is custom designed to conform to existing facilities and local requirements.

The foregoing disclosure is representative of a preferred form of the invention and is to be interpreted in an illustrative rather than a limiting sense, the invention to be accorded the full scope of the claims appended hereto.

What is claimed is:

1. A process for treating wastewaters containing solids and organic matter, which comprises passing wastewater influent through a screen for removal of solids, incorporating a floculating agent into said last-mentioned influent to floculate any fine solid particles remaining in said influent, passing air under pressure into the resulting influent, introducing said influent containing dissolved air under pressure and floculated solids into the lower portion of a flotation chamber at a pressure substantially below the pressure of the air in said influent, causing the air bubbles released from said influent to float the floculated suspended solids to the surface of said influent in said flotation chamber, removing said floculated solids as a scum from the surface of said influent, withdrawing the resulting substantially clear influent from the flotation chamber, and treating said last-mentioned influent with a sterilizing agent in a sterilizer tank, to destroy bacteria in said influent and sterilize same, and filtering the sterilized influent for removal of any remaining undissolved solids.

2. A process as in claim 1, including collecting solid matter as a sludge during the initial solids removal step and returning it to the influent to said screen.

3. A method as in claim 1, including transporting the solid matter recovered to a solid matter press and pressing the matter into blocks, recovering the expressed water from the solid matter, and recirculating it to the wastewater influent to the said screen.

4. The process as defined in claim 1, including removing a portion of said influent withdrawn from said flotation chamber, again incorporating a floculating agent into said portion of influent to floculate any fine solid particles remaining in said influent portion, passing air under pressure into the resulting influent portion, introducing the resulting portion of influent containing dissolved air under pressure and said floculated solids into the lower portion of a second flotation chamber at a pressure substantially below the pressure of the air in said portion of influent, causing the air bubbles released from said influent to float the floculated suspended solids to the surface of said influent in said second flotation chamber, removing said floculated solids as a scum from the surface of said influent, withdrawing the resulting substantially clear influent from the flotation chamber and treating said last-mentioned influent with a sterilizing agent in said sterilizer tank and containing influent introduced therein from the first-mentioned flotation chamber.

5. The process as defined in claim 4, wherein said passing air under pressure into the portion of influent withdrawin from said first-mentioned flotation chamber is carried out at relatively higher pressure than the air pressure passed into the influent prior to introduction thereof into said first-mentioned flotation chamber.

6. The process as defined in claim 1, including collecting said scum of floculated solids removed from the surface of said influent in said flotation cell, in a scum tank, centrifuging said scum, recovering the solids from said centrifuging and mixing water from the centrifuging with the incoming influent.

7. The process as defined in claim 6, including mixing the solids recovered from said centrifuging with the solids removed by passage of said influent through said screen, and incinerating the resulting mixture of solids.

8. The process as defined in claim 7, including collecting any grit particles from the bottom of said flotation chamber, conducting a water slurry of said grit particles to said wet well, and filtering said grit particles and mixing the recovered grit particles with solids recovered from said centrifuging and with solids recovered by passage of said influent through said screen.

9. The process as defined in claim 6, including back washing the solids from the filter employed in filtering said influent and introducing said back wash into said scum tank.

10. The process as defined in claim 6, including introducing said influent following passage thereof through said screen, into a wet well, and introducing said water from said centrifuging into said wet well.

11. The process as defined in claim 6, including withdrawing water from the sterilizer tank and mixing said water with the incoming influent for recirculation therewith.

12. A process for treating wastewaters containing solids and dissolved organic matter, which comprises passing wastewater influent through a screen for removal of solids, incorporating a floculating agent into said last-mentioned influent to floculate any fine solid particles remaining in said influent, passing air under pressure into the resulting influent, introducing said influent containing dissolved air under pressure and floculated solids into the lower portion of a flotation chamber at about atmospheric pressure, the reduction in pressure of said influent causing the air bubbles released from said influent to float the floculated suspended solids to the surface of said influent in said flotation chamber, removing said floculated solids as a scum from the surface of said influent, withdrawing the resulting substantially clear influent from the flotation chamber, treating said last-mentioned influent with chlorine or ozone in a sterilizer tank, to destroy bacteria in said influent, filtering the sterilized influent for removal of any remaining undissolved solids, collecting said scum of floculated solids removed from the surface of said influent in said flotation chamber, in a scum tank, centrifuging said scum, recovering the solids from said centrifuging and mixing water from the centrifuging with the incoming influent following the screening of said influent, mixing the solids recovered from said centrifuging with the solids removed by passage of said influent through said screen, and incinerating the resulting mixture of solids.

13. The process as defined in claim 12, including introducing said influent following passage thereof through said screen, into a wet well, and introducing said water from said centrifuging into said wet well, and including backwashing the solids from the filter employed in filtering said sterilized influent and introducing said back wash into said scum tank, and intermittently adding fresh water to said sterilizer tank and to said centrifuge for back washing same, and intermittently withdrawing water from the sterilizer tank and passing said water through said screen for recirculation with the incoming influent.

14. The process as defined in claim 12, including removing a portion of said influent withdrawn from said flotation chamber, again incorporating a floculating agent into said portion of influent to floculate any fine solid particles remaining in said influent portion, passing air under pressure into the resulting influent portion, introducing the resulting portion of influent containing dissolved air under pressure and said floculated solids into the lower portion of a second flotation chamber at atmospheric pressure, causing the air bubbles released from said influent to float floculated suspended solids to the surface of said influent in said flotation chamber, removing said floculated solids as a scum from the surface of said influent, withdrawing the resulting substantially clear influent from the flotation chamber and treating said last-mentioned influent with chlorine or ozone in said sterilizer tank and containing influent introduced therein from the first mentioned flotation chamber.

15. A system for treatment of wastewater containing solids and dissolved organic matter, for purifying said wastewater, which comprises means for separating solids from wastewater influent, means for introducing a floculating agent into said last-mentioned influent to floculate any fine solid particles remaining in said influent, means for introducing air under pressure into the resulting influent, a flotation chamber, means for introducing said influent containing dissolved air under pressure and floculated solids into the lower portion of said flotation chamber, said flotation chamber being maintained at a pressure substantially below the pressure of the air in said influent, causing the sir bubbles released from said influent to float the floculated suspended solids to the surface of said influent in said flotation chamber, a sterilizer tank containing a sterilizing agent, means for withdrawing substantially clear influent from the flotation chamber and feeding same to said sterilizer tank, to destroy bacteria in said influent, and means for withdrawing said floculated solids as scum from the surface of said influent in said flotation chamber, filtering means, and means for feeding the sterilized influent from said sterilizer tank to said filtering means for removal of any remaining undissolved solids and for recovery of purified water.

16. A system as defined in claim 15, including a second flotation chamber, means for removing a portion of the influent withdrawn from the first-mentioned flotation chamber, means for introducing a floculating agent into said portion of influent, means for introducing air under pressure into said portion of influent, means for introducing said influent portion containing dissolved air under pressure and floculated solids into the lower portion of said second flotation chamber, said second flotation chamber being maintained at a pressure substantially below the pressure of the air in said portion of influent, to cause the air bubbles released from said influent portion to float the floculated suspended solids to the surface of said portion of influent in said second flotation chamber, means for removing said last-mentioned floculated solids as scum from the surface of said portion of influent in said second flotation chamber, means for withdrawing the resulting substantially clear portion of influent from the second flotation chamber, and means for feeding said last-mentioned influent portion to said sterilizer tank for admixture with influent fed thereto from said first-mentioned flotation chamber.

17. The system as defined in claim 16, said means for withdrawing substantially clear influent from the first-mentioned flotation chamber and feeding same to said sterilizer tank, and said means for removing a portion of said influent for passage to said second flotation chamber, comprising a system of weirs.

18. The system as defined in claim 17, including a wet well, means for introducing wastewater influent to said wet well following separation of said solids from said influent, a first pump for pumping influent from said wet well to said first-mentioned flotation chamber or to said second flotation chamber, a second back-up pump for said first pump in said wet well, and a third pump in said wet well, said third pump being actuatable for pumping influent only to said second flotation chamber when the influent in said wet well reaches a predetermined high level, said system of weirs operating during actuation of said third pump to feed all of the influent withdrawn from said first mentioned flotation chamber to said sterilizer tank, whereby during peak flow of influent into said wet well, both of said flotation chambers operate independently and simultaneously for treatment of all of the influent flowing into said wet well.

19. The system as defined in claim 15, including a scum tank, means for feeding scum withdrawn from the surface of said influent in said flotation chamber to said scum tank, centrifuging means, means for feeding scum from said scum tank to said centrifuging means, means for removing solids from said centrifuging means, and means for withdrawing the water from said centrifuging means and mixing same with the incoming influent following removal of solids therefrom.

20. The system as defined in claim 19, said means for separating solids from said wastewater influent comprising screening means, a hopper, means for feeding solids separated on said screening means to said hopper, said means for removing the solids from said centrifuging means communicating with said hopper for feeding said solids to said hopper, an incinerator, and means for feeding solids to said incinerator.

21. The system as defined in claim 19, said means for separating solids from wastewater influent comprising screening means, and including a wet well, means for discharging water from said screening means into said wet well, means for recirculating water from said sterilizer tank to said wet well, and means for discharging water from said centrifuging means into said wet well.

22. The system as defined in claim 19, said filtering means comprising dual filters, means for back washing said filters, one of said filters being on stream while the other is being back washed, means for storing purified water removed from said filters, and means for discharging the back wash from said filters into said scum tank.

23. The system as defined in claim 19, including means for feeding fresh water into said sterilizer tank and means for feeding fresh water into said centrifuging means.

24. The system as defined in claim 15, said means for separating solids from said wastewater influent comprising screening means, and also including a hopper, means for feeding separated solids from said screening means to said hopper, an incinerator, and means for feeding solids from said hopper to said incinerator.

25. The system as defined in claim 15, said means for separating solids from wastewater influent comprising screening means, and including a wet well, means for discharging water from said screening means into said wet well, and means for recirculating water from said sterilizer tank to said wet well.

26. The system as defined in claim 15, said filtering means comprising dual filters, means for back washing said filters, one of said filters being on stream while the other is being back washed, and means for storing purified water removed from said filters.

* * * * *